United States Patent
Dawson et al.

(10) Patent No.: US 9,310,961 B2
(45) Date of Patent: *Apr. 12, 2016

(54) VIRTUAL WORLD TELEPORTATION

(71) Applicant: International Business Machines Corporation, Armonk, NY (US)

(72) Inventors: Christopher J. Dawson, Arlington, VA (US); Vincenzo V. Di Luoffo, Sandy Hook, CT (US); Rick A. Hamilton, II, Charlottesville, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 421 days.

This patent is subject to a terminal disclaimer.

(21) Appl. No.: 14/036,326

(22) Filed: Sep. 25, 2013

(65) Prior Publication Data

US 2014/0026077 A1    Jan. 23, 2014

Related U.S. Application Data

(63) Continuation of application No. 12/114,228, filed on May 2, 2008, now Pat. No. 8,584,025.

(51) Int. Cl.
*G06F 3/048* (2013.01)
*G06F 3/0481* (2013.01)
*A63F 13/40* (2014.01)
*A63F 13/30* (2014.01)

(52) U.S. Cl.
CPC .......... *G06F 3/04815* (2013.01); *A63F 13/10* (2013.01); *A63F 13/12* (2013.01); *A63F 2300/406* (2013.01); *A63F 2300/407* (2013.01); *A63F 2300/5533* (2013.01); *A63F 2300/5553* (2013.01)

(58) Field of Classification Search
CPC ...................................................... G06F 3/0482
USPC ......................................... 715/757, 706, 839
See application file for complete search history.

(56) References Cited

U.S. PATENT DOCUMENTS

| | | | |
|---|---|---|---|
| 6,271,843 B1 | 8/2001 | Lection et al. | |
| 6,636,210 B1 | 10/2003 | Cheng | |
| 6,714,222 B1 | 3/2004 | Bjorn et al. | |
| 7,043,695 B2 * | 5/2006 | Elber ...................... | G06T 17/00 345/418 |
| 7,086,005 B1 | 8/2006 | Matsuda | |
| 7,167,258 B2 * | 1/2007 | Yamamoto ......... | H04N 1/00127 358/1.13 |
| 7,181,690 B1 | 2/2007 | Leahy et al. | |
| 7,269,632 B2 | 9/2007 | Edeker et al. | |

(Continued)

OTHER PUBLICATIONS

Song, U.S. Appl. No. 12/114,228, Office Action Communication, Mar. 3, 2011, 13 pages.

(Continued)

*Primary Examiner* — Daeho Song
(74) *Attorney, Agent, or Firm* — Lisa Ulrich; Hoffman Warnick LLC

(57) ABSTRACT

The present invention is directed to teleporting avatars between disparate virtual worlds. A system is disclosed that includes a facility for creating a persona profile for an avatar in a first virtual world when the avatar wants to be teleported out of the first virtual world; a facility for transferring persona profiles to and from a disparate virtual world; and a facility for instantiating an inbound avatar based on a received persona profile. Persona profiles may include, e.g., rendering information, trait information, and inventory information.

7 Claims, 3 Drawing Sheets

(56) References Cited

U.S. PATENT DOCUMENTS

| | | | |
|---|---|---|---|
| 7,444,423 B2* | 10/2008 | Shahi | G06F 17/30899 707/E17.119 |
| 7,881,917 B2* | 2/2011 | Nagatsuka | B25J 9/1671 703/6 |
| 2001/0018658 A1 | 8/2001 | Kim | |
| 2002/0026388 A1* | 2/2002 | Roebuck | G06Q 30/02 705/27.2 |
| 2002/0138607 A1 | 9/2002 | O'Rourke et al. | |
| 2002/0188678 A1 | 12/2002 | Edecker et al. | |
| 2003/0014423 A1 | 1/2003 | Chuah et al. | |
| 2003/0119531 A1 | 6/2003 | Patton et al. | |
| 2004/0034683 A1* | 2/2004 | Zhao | H04L 12/5693 709/201 |
| 2004/0259065 A1* | 12/2004 | Geiger | G06T 5/009 434/272 |
| 2005/0101845 A1 | 5/2005 | Nihtila | |
| 2005/0281540 A1* | 12/2005 | Inokuchi | G11B 20/00086 386/232 |
| 2006/0119598 A1 | 6/2006 | Littlefield | |
| 2006/0178966 A1 | 8/2006 | Jung et al. | |
| 2006/0178975 A1 | 8/2006 | Jung et al. | |
| 2007/0050716 A1 | 3/2007 | Leahy et al. | |
| 2007/0099685 A1* | 5/2007 | Van Luchene | A63F 13/12 463/1 |
| 2007/0113181 A1* | 5/2007 | Blattner | G06F 3/011 715/706 |
| 2007/0167204 A1 | 7/2007 | Lyle et al. | |
| 2007/0179867 A1 | 8/2007 | Glazer et al. | |
| 2008/0086696 A1* | 4/2008 | Sri Prakash | G06Q 10/00 715/757 |
| 2008/0120558 A1 | 5/2008 | Nathan et al. | |
| 2008/0134055 A1 | 6/2008 | Satchell | |
| 2008/0134056 A1 | 6/2008 | Shuster | |
| 2008/0155019 A1 | 6/2008 | Wallace et al. | |
| 2008/0163055 A1 | 7/2008 | Ganz et al. | |
| 2008/0201638 A1 | 8/2008 | Nair | |
| 2008/0204448 A1 | 8/2008 | Dawson et al. | |
| 2008/0208749 A1* | 8/2008 | Wallace | G06Q 20/40 705/44 |
| 2008/0214214 A1 | 9/2008 | Reissmueller et al. | |
| 2008/0215994 A1* | 9/2008 | Harrison | A63F 13/10 715/757 |
| 2008/0254813 A1 | 10/2008 | Kano et al. | |
| 2008/0263446 A1 | 10/2008 | Altberg et al. | |
| 2008/0263459 A1 | 10/2008 | Altberg et al. | |
| 2008/0263460 A1* | 10/2008 | Altberg | G06Q 30/02 715/757 |
| 2008/0268960 A1 | 10/2008 | Farrier et al. | |
| 2008/0274806 A1 | 11/2008 | Ganz et al. | |
| 2008/0309675 A1 | 12/2008 | Fleury et al. | |
| 2009/0019366 A1 | 1/2009 | Abhyanker | |
| 2009/0037905 A1 | 2/2009 | Hamilton, II et al. | |
| 2009/0044113 A1* | 2/2009 | Jones | G06T 13/40 715/707 |
| 2009/0058862 A1 | 3/2009 | Finn et al. | |
| 2009/0063970 A1 | 3/2009 | Steinmetz | |
| 2009/0077475 A1 | 3/2009 | Koster et al. | |
| 2009/0089684 A1 | 4/2009 | Boss et al. | |
| 2009/0100353 A1 | 4/2009 | Cradick et al. | |
| 2009/0106672 A1 | 4/2009 | Burstrom | |
| 2009/0112359 A1* | 4/2009 | Sanguinetti | G06Q 10/08 700/228 |
| 2009/0116641 A1 | 5/2009 | Bokor et al. | |
| 2009/0119588 A1 | 5/2009 | Moore | |
| 2009/0124349 A1 | 5/2009 | Dawson et al. | |
| 2009/0131166 A1 | 5/2009 | Smith et al. | |
| 2009/0132641 A1* | 5/2009 | Sanguinetti | G06Q 30/00 709/203 |
| 2009/0157495 A1 | 6/2009 | Cahuzac et al. | |
| 2009/0158151 A1 | 6/2009 | Cheng et al. | |
| 2009/0158170 A1 | 6/2009 | Narayanan et al. | |
| 2009/0187832 A1* | 7/2009 | Cheng | H04L 12/1822 715/757 |
| 2009/0235350 A1 | 9/2009 | Garbow et al. | |
| 2009/0251537 A1* | 10/2009 | Keidar | G08B 13/19645 348/143 |
| 2009/0253475 A1 | 10/2009 | Thompson et al. | |
| 2009/0267938 A1 | 10/2009 | Nocol, II et al. | |
| 2009/0276718 A1 | 11/2009 | Dawson et al. | |

OTHER PUBLICATIONS

Song, U.S. Appl. No. 12/114,228, Final Office Action Communication, Aug. 10, 2011, 13 pages.
Song, U.S. Appl. No. 12/114,228, Office Action Communication, Apr. 12, 2013, 11 pages.
Song, U.S. Appl. No. 12/114,228, Notice of Allowance and Fees Due, Jul. 3, 2013, 17 pages.
Notice of Allowance and Fee(s) Due for U.S. Appl. No. 14/036,331, dated Jul. 29, 2015, 18 pages.
Notice of Allowance and Fee(s) Due for U.S. Appl. No. 14/036,153, dated Jul. 14, 2014, 18 pages.

* cited by examiner

VIRTUAL WORLD TELEPORTATION

REFERENCE TO PRIOR APPLICATIONS

This application is a continuation application of co-pending U.S. patent application Ser. No. 12/114,228, filed on May 2, 2008, which is hereby incorporated by reference.

FIELD OF THE INVENTION

The present invention relates to virtual environments, and more specifically relates to a platform for teleporting avatars between virtual worlds using persona profiles.

BACKGROUND OF THE INVENTION

A virtual environment is an interactive simulated environment accessed by multiple users through an online interface. Users inhabit and interact in the virtual environment via avatars, which are two or three-dimensional graphical representations of humanoids. There are many different types of virtual environments, however there are several features many virtual environments generally have in common:
A) Shared Space: the world allows many users to participate at once.
B) Graphical User Interface: the environment depicts space visually, ranging in style from 2D "cartoon" imagery to more immersive 3D environments.
C) Immediacy: interaction takes place in real time.
D) Interactivity: the environment allows users to alter, develop, build, or submit customized content.
E) Persistence: the environment's existence continues regardless of whether individual users are logged in.
F) Socialization/Community: the environment allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual environments (e.g., universes, worlds, etc.), such as that provided in the on-line world Second Life (Second Life is a trademark of Linden Research in the United States, other countries, or both). The Second Life client program provides its users (referred to as residents) with tools to view, navigate, and modify the Second Life world and participate in its virtual economy.

Second Life and other on-line virtual environments present a tremendous new outlet for both structured and unstructured virtual collaboration, gaming and exploration, as well as real-life simulations in virtual spaces. These activities, along with yet to be disclosed new dimensions, in turn provide a wide open arena for creative and new communication methods and mechanisms.

As more and more virtual environments come into existence, each environment may offer different experiences that may be desirable to an end user. For instance, some virtual environments may be more geared toward amusement, while others are more geared for business. As such, users may want at different times to visit different virtual environments. In general, each environment is disparate in that each may be instantiated by different service providers, utilize different proprietary systems, and require the creation of a unique account to participate. Accordingly, in order to participate in multiple environments, a user must create a different account (and avatar) in each different virtual environment. In view of the foregoing, there exists a need for an approach that addresses at least one of the deficiencies of the related art.

SUMMARY OF THE INVENTION

The present invention provides distributed persona profiles that can be accessed by diverse virtual universe environments, thus allowing avatars to be teleported there between. For the purposes of the entire disclosure, the terms virtual environment and virtual world are used interchangeably.

A first aspect of the present invention is directed to a teleportation system for teleporting avatars between disparate virtual worlds, comprising: a system for managing a persona profile for an avatar in a first virtual world; a system for transferring persona profiles to and from a disparate virtual world; and a system for instantiating an inbound avatar in the first virtual world based on a received persona profile.

A second aspect of the present invention is directed to a computer program product stored on a computer readable medium for teleporting avatars between disparate virtual worlds, comprising: program code for creating a persona profile for an avatar in a first virtual world; program code for transferring persona profiles to and from a disparate virtual world; and program code for instantiating an inbound avatar at the first virtual world based on a received persona profile.

A third aspect of the present invention is directed to a method for teleporting avatars between disparate virtual worlds, comprising: receiving a request for teleporting an avatar from a first virtual world to a destination virtual world; updating a persona profile for the avatar in the first virtual world; transferring the persona profile to the destination virtual world; and disabling the avatar in the first virtual world.

A fourth aspect of the present invention is directed to a method for deploying an application for providing a method for deploying an application for providing teleportation for avatars between disparate virtual worlds, comprising: providing a computer infrastructure being operable to: create a persona profile for an avatar in a first virtual world; transfer persona profiles to and from a disparate virtual world; and instantiate an inbound avatar based on a received persona profile.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
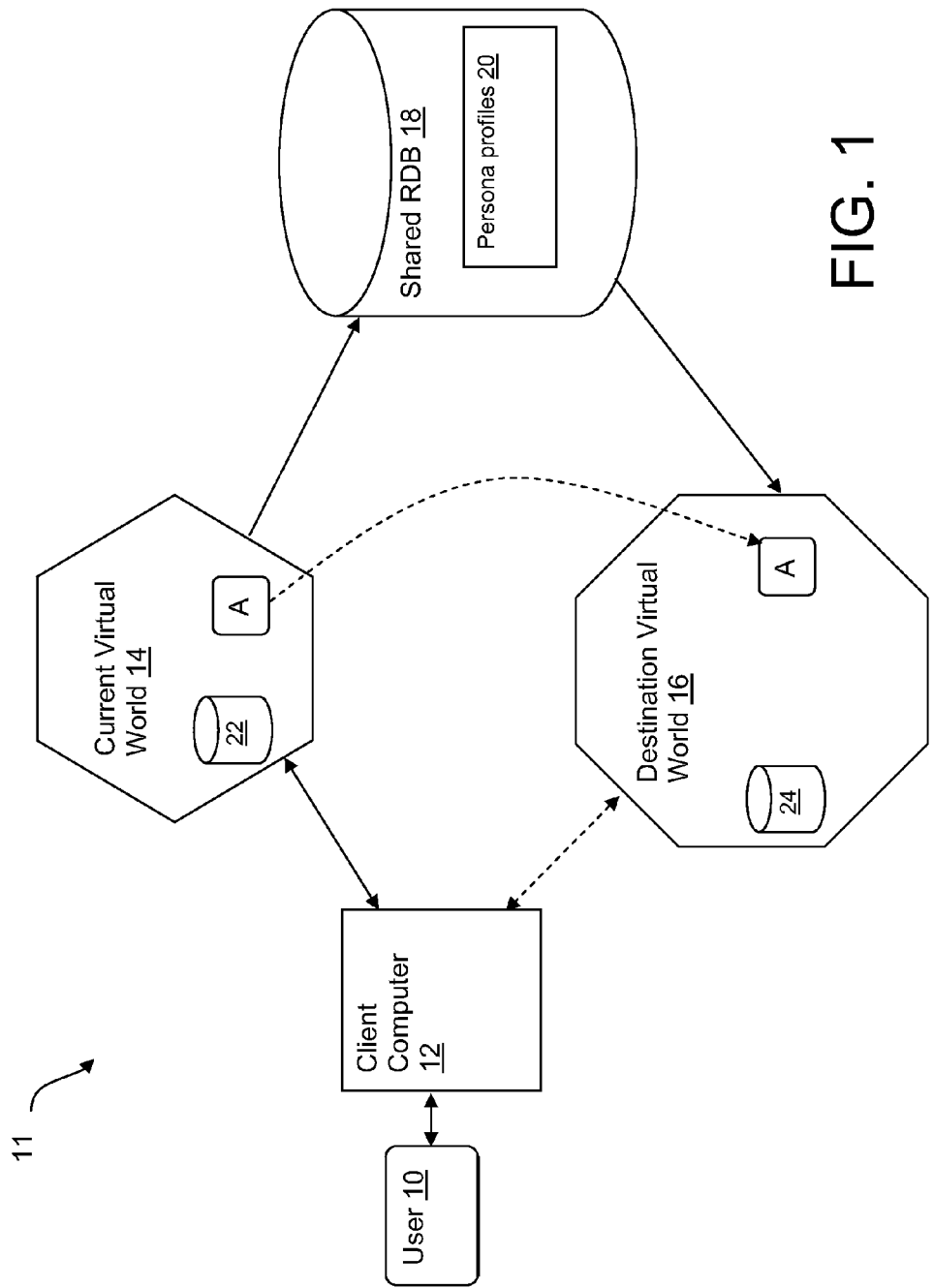
FIG. 1 depicts a system for teleporting avatars between virtual words in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As noted, the present invention provides a platform for allowing avatars to teleport between disparate virtual worlds. More specifically, utilizing the teleportation platform, an avatar can be automatically disabled at a first virtual world and instantiated at a destination virtual world. From the user's perspective, this alleviates the need to log in and out of disparate virtual worlds to exploit different experiences. In addition, it allows the user to maintain characteristics and information held by the avatar in different virtual worlds.

As described in further detail herein, the teleportation platform utilizes persona profiles to describe avatars to each virtual world using (i.e., participating in) the teleportation platform. Upon request, the teleportation platform collects and packages details (i.e., a persona profile) of the avatar at a current virtual world, and then transfers those details to a destination virtual world when a request for teleportation is received. From the user's prospective, there is little inconvenience, as the user's client is merely redirected to a new server. Each participating world includes a teleportation system, described below, to facilitate teleportation. Thus, at any point in time, a unique avatar may be rendered in any participating virtual world.

The persona profile may include any relevant attributes, such as appearance, inventory, personality, past conversations and user preferences. It may also include other code segments that accompany the avatar, such as an MP3 music player or advanced rendering software which can be used to automatically determine the best location for the avatar to be transitioned or teleported to.

FIG. 1 depicts an illustrative embodiment of a teleportation platform 11. In this example, two participating but disparate virtual worlds, current virtual world 14 and destination virtual world 16, are shown. In this example, a user 10, via client computer 12, has instantiated avatar A in current virtual world 14. When user 10 wants to have avatar A teleported to destination virtual world 16, the user 10 submits a request for teleportation from within the current virtual world 14. Avatar A's persona profile is created/updated at the current virtual world 14 (e.g., in local database 22), and is loaded to a shared remote database (RDB) 18, where it is stored with other persona profiles 20. Destination virtual world 16 is notified of an inbound avatar. Assuming the inbound avatar is to be let in, the associated persona profile is loaded from shared RDB 18 and loaded into local database 24. Destination virtual world 16 then uses the persona profile to instantiate avatar A. Once the avatar is instantiated in destination virtual world 16, control of the client computer 12 is passed from current virtual world 14 to destination virtual world 16.

Figure 2:
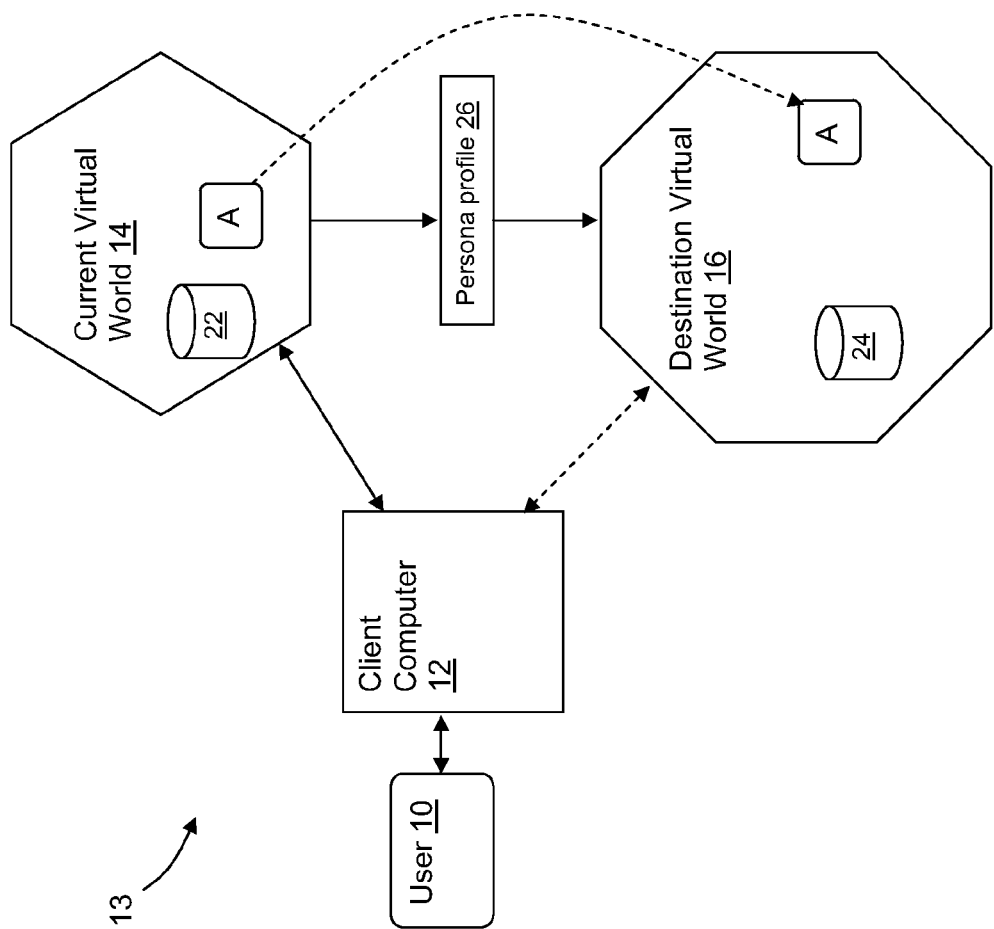
FIG. 2 depicts a system for teleporting avatars between virtual words in accordance with an alternate embodiment of the present invention.

FIG. 2 depicts an alternative embodiment of a teleportation platform in which the persona profile 26 of avatar A is packaged and sent directly to destination virtual world 16 from current virtual world 14. In either case, the persona profile 26 may be implemented using a universal data construct, such as an XML file, for holding a collection of information about the avatar. When the user 10, through his/her avatar A, requests a transfer or 'teleport' to another virtual world, the avatar is essentially frozen in time in the current virtual world 14 while the avatar's persona profile is created/updated. Illustrative data that makes up a persona profile may for example include:

(A) Rendering information of the avatar, which may comprise: physical format (human, animal, free-form, etc.); physical characteristics; visual characteristics (hair color, eye color, clothing, etc.); personality attributes (gestures, movements, voice, etc.); dimensional size within the virtual world; current capabilities; and unique identifier data.

A unique identifier (UID), analogous to a person's social security number, is embedded into each persona such that two persons with the same number could not be created. This UID is then used to ensure that the avatar can move between virtual world providers whilst rendering based on the same persona profile.

(B) Past behaviors and traits, which may include demonstrated traits and other actions that can be used to determine the tendencies of the avatar. This information is included in the persona profile to determine the current 'personal tendencies' of the avatar. For example, if the avatar chats with other avatars on a regular basis, this information should be stored such that the avatar may be categorized as "friendly" or "talkative".

(C) Virtual World Civil and Criminal Record Violations and civil offenses, such as criminal offenses, citations, warnings, virtual jail time, ejections from virtual worlds or virtual world regions. Any information that relates to unsocial behaviors could also be stored in the profile. Similar to a driving record list of citations, this information would be used when evaluating whether the avatar should be authorized to transfer to or be accepted into another virtual world.

(D) Current and past Inventory, namely items carried and any associated valuables (e.g., a designer suit worth 100 points). Other information may include items once carried and discarded, currency and other items of trade (e.g., money, coupons, and other tradable items), special abilities and any associated values (e.g., can fly at warp speed worth 25 points). Any information that pertains to current inventory of the avatar including past items carried would be stored in the persona profile. Again, this information can be used to evaluate whether the avatar should be authorized to be transferred. As an example, an avatar may have a special ability of invisibility in the current virtual world, but upon attempting to transfer to a differing virtual world which does not allow invisible residents, the avatar would have to sacrifice this ability or be denied entry.

(E) Audit trail information, such as past locations visited, past conversations (e.g., keywords of interest), time on-line, interaction with other avatars or virtual world objects, other data usable for pattern recognition (e.g., Avatar A generally enters, goes to the virtual cafe, then teleports with a friend to another location).

Each of these pieces of information is parsed, formatted, and stored in a defined data construct that can be easily communicated and interpreted by each participating virtual world. Some of the persona profile information may be easily determined, e.g., current inventory, while other pieces of information may need to be collected and compiled on a periodic basis, such as behavioral traits. In the embodiment of FIG. 1, data is stored and accessed using a shared relational database (RDB) 18, in which persona profile data may be stored and extracted by participating virtual worlds using existing tools such as SQL. Another implementation may involve using a series of data objects or files, separated by object type (e.g., items A through E described above) combined into a single file. Yet another embodiment may utilize a binary data table populated using a code or key that defines the persona of the avatar.

The persona profile can be stored locally within the virtual world provider environment currently rendering the avatar, remotely or both. In order to prevent large amounts of processing to recreate persona profile data each time a transfer or 'teleport' is requested, the persona profile can be updated incrementally. RDB technology can be used to determine which fields of the persona profile have changed and when the change occurred. The determination could be used to update the destination virtual world 16 only with data that has changed since the avatar's last visit. Other techniques may be based on a time delay, or asynchronously when an avatar requests teleportation, up-to-date information would be incorporated into the profile. Persona profile data may be stored on nonvolatile storage such as a disk, CD, DVD, or other such devices.

During a request to teleport from one world to another (assuming that the persona profile has been created and is up-to-date), the data must be packaged, transferred and unpacked on the destination system. In an illustrative embodiment, this data can be accessed via a SQL request to a shared RDB 18. It is also feasible that the transfer could be achieved via other techniques such as an FTP transfer or using TCP/IP sockets. The same algorithm used to create the persona profile (RDB records, tar, XML, ZIP, RAR, etc.) may be used to access and/or unpack the persona profile on the destination virtual world 16. Once the persona profile has been transferred to the destination virtual world 16 and unpacked, it is used to recreate the avatar A. Using the UID stored in the persona profile, various checks may be made by the destination virtual world 16, e.g., whether the avatar has already been rendered, whether the avatar should be allowed in, etc. In certain cases, the transfer would be denied.

Information in the persona profile may also be used to automatically select the 'ideal' region in the destination virtual world 16 to locate the incoming avatar A. Namely, predetermined information can be processed that can be used to specifically render the avatar in a region that is the most likely place the avatar would like to be. This intelligence can be built into the teleportation platform 11 such that the region within the destination virtual world 16 need not be specified.

Consider the following example of a persona profile with the following components:

Name: Chris Rolls
Age: 42
User Interests: Software Products
Habits: Chris likes to walk around rather than fly
Past Conversations: Chris has chatted mainly to IT specialists and Architects but has not chatted with other avatars on non-IT details
Likes: Flat regions where avatar can walk around. Likes other avatars with same interests to be near
Dislikes: Very crowded areas, loud music or other distractions, shopping.

Chris Rolls now wishes to teleport to a new virtual world provider because he has determined that there are a large number of avatars with interests in software products. In this case, Chris wants to teleport to the new virtual world provider but does not specify a specific region (either because the avatar does not know of the region, or because he would like to be automatically placed in the 'best' region based on his persona profile). The system controlling the destination virtual world 16 receives the persona profile information and analyzes the information to determine the best region to render the avatar in. The system determines that there is a region that is currently rendering many IT specialists and therefore chooses this region. Chris is therefore transferred to the selected region in the new virtual world provider.

A feature of transportation platform 11 includes a checking system that can scan the persona profile for information that may be necessary to allow or deny a transfer to another virtual world region. For example, modifications (e.g., indicative of a virus) to the persona profile can be checked, much the same way that a file is checked for viruses before it is sent via e-mail. Compatibility and compliance requirements can likewise be checked. For instance, rendering information, such as specific textures of clothes, which do not exist in the destination virtual world 16, must be identified and dealt with. Anything that could generate errors or otherwise negatively impact the destination virtual world 16 provider can likewise be checked.

Figure 3:
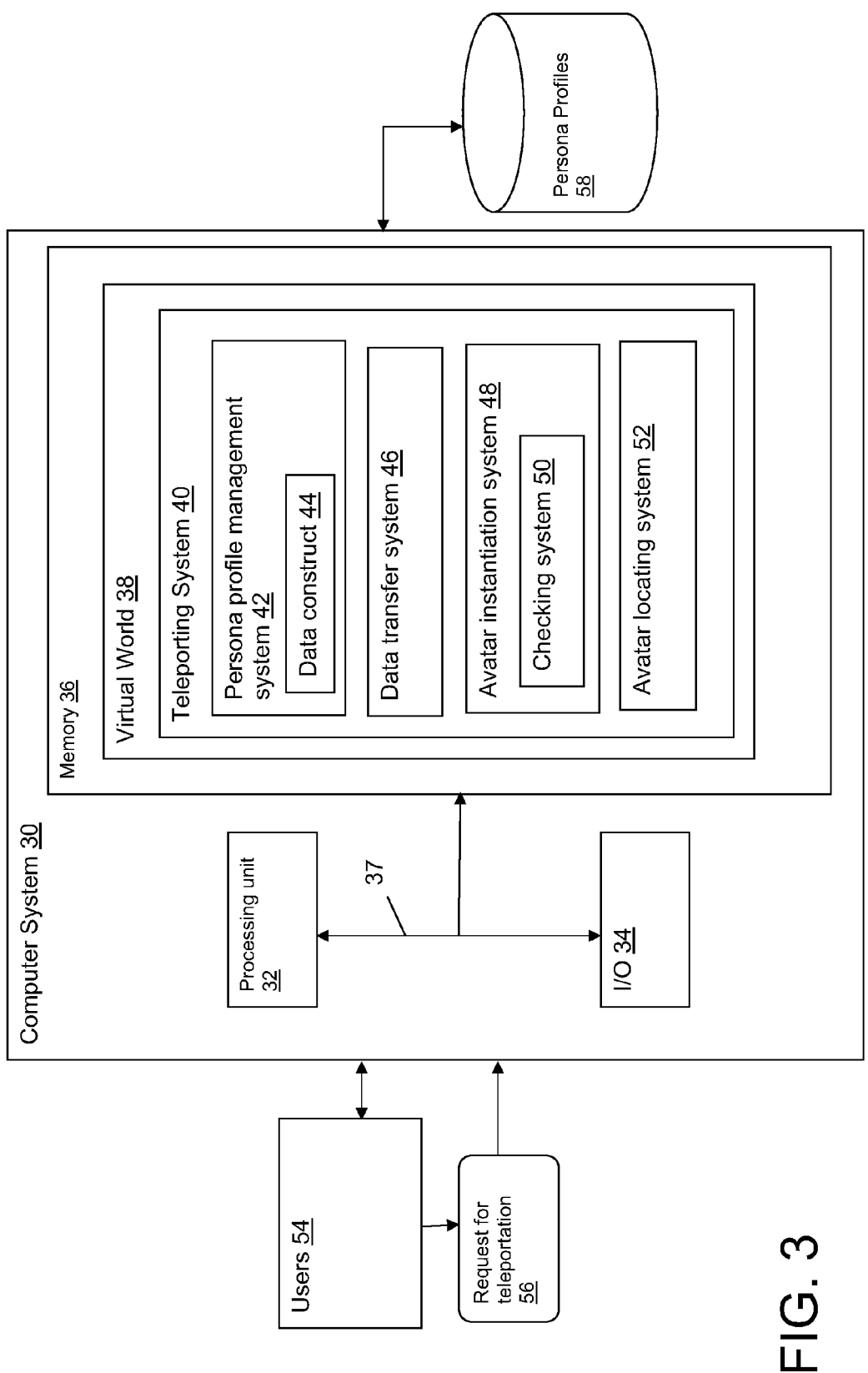
FIG. 3 depicts a computer system having a teleporting system in accordance with an embodiment of the present invention.

FIG. 3 depicts a computer system 30 containing program code or the like for implementing a virtual world 38 that can accessed by users 54. Virtual world 38 is generally instantiated by a service provider via one or more servers, and includes facilities for allowing users 54 to create and manipulate avatars as discussed above. Virtual world 38 includes a teleporting system 40 for teleporting outbound avatars to destination virtual worlds (e.g., provided by other providers on other computer systems), and for receiving inbound avatars being transported from different virtual worlds. Teleporting system 40 includes a persona profile management system 42 for creating and updating persona profiles 58; a data transfer system 46 for transmitting and receiving persona profiles to and from other virtual worlds; an avatar instantiation system 48 for creating inbound avatars when virtual world 38 acts as a destination; and an avatar locating system 52 for determining where to locate the inbound avatar in the virtual world 38.

As noted above, teleportation is implemented among participating disparate virtual worlds with use of persona profiles 58 that essentially describe all of the attributes of the avatar. A persona profile 58 is implemented using a predefined data construct 44 (i.e., format or schema) that is either universal to each of the participating virtual worlds, or can be readily interpreted or converted into a universal format. The persona profile 58 for an avatar can either be created on demand when a request for teleportation 56 is received from a user, or the persona profile 58 can be updated and maintained in a local or shared database.

Data transfer system 46 is responsible for transmitting and receiving persona profiles 58 to and from other virtual worlds. As noted above, this can be done in any manner. For instance, persona profiles 58 can be loaded and stored on a shared relational database that can be accessed by participating virtual worlds, be loaded directly between virtual worlds, etc. In the event that data construct 44 is implemented in a proprietary format, data transfer system 46 may also include an interface that, e.g., converts between the proprietary format and a shared format, or directly between proprietary formats of disparate virtual worlds.

Avatar instantiation system 48 is responsible for creating new avatars based on received persona profiles when avatars are teleported into the virtual world 38. Avatar instantiation system 48 is also responsible for disabling avatars when an avatar teleports out of virtual world 38. As part of the process, a checking system 50 is provided that determines whether an avatar is allowed to teleport into and/or out of virtual world 38. Checking system 50 can examine any criteria for making such a determination, and may also check for other things, such as viruses, compatibilities, errors, etc.

Avatar locating system 52 determines where to locate an inbound avatar. In particular, avatar locating system 52 can look at any criteria, e.g., information in the persona profile 58, specific requests, etc., to determine a region in virtual world 38 in which to instantiate the avatar.

Computer system 30 is shown as including a processing unit 32, a memory 36, at least one input/output (I/O) interface 34, and a bus 37. Further, the computer system 30 may also include other facilities such as external devices and storage systems. In general, the processing unit 32 executes computer program code, such as virtual world 40, that is stored in memory 36. While executing computer program code, the processing unit 32 can read and/or write data from/to the memory 36, a storage system, and/or I/O interface(s) 34. Bus 37 provides a communication link between each of the components in the computer system 30. The external device(s) can comprise any device (e.g., display) that enables a user to interact with the computer system 30 or any device that enables the computer system 30 to communicate with one or more other computer systems.

The computer system 30 can comprise any general purpose computing article of manufacture capable of executing computer program code installed thereon (e.g., a personal computer, server, handheld device, etc.). However, it is understood that the computer system 30 is only representative of various possible computer systems that may perform the various processes of the invention. To this extent, in other embodiments, the computer system 30 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the virtual world platforms shown in FIGS. 1 and 2 are only illustrative of various types of platforms that can be used to implement the present invention. For example, in an embodiment, the computer platform 11 can comprise two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that the various systems can be implemented independently, combined, and/or stored in memory for one or more separate computer systems that communicate over a network. Further, it is understood that some of the systems and/or functionality may not be implemented, or additional systems and/or functionality may be included as part of the invention.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 36 and/or a storage system (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the processes of the invention on a subscription, advertising, and/or fee basis. A service provider can create, maintain, support, etc., a computer system 30 that performs the processes of the invention for one or more customers. In return, the service provider can receive payment from the customer(s) under a subscription and/or fee agreement and/or the service provider can receive payment from the sale of advertising space to one or more third parties.

In still another embodiment, a virtual world can be obtained (e.g., created, maintained, having made available to, etc.) and one or more systems for performing the processes of the invention can be obtained (e.g., created, purchased, used, modified, etc.) and deployed within a teleporting platform 11. To this extent, the deployment of each system can comprise one or more of (1) installing program code on a computer system, such as the computer system 30 (FIG. 3), from a computer-readable medium; (2) adding one or more computer systems to the computer infrastructure; and (3) incorporating and/or modifying one or more existing systems of the computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A teleportation system for teleporting avatars between disparate virtual worlds, comprising:
    at least one processing unit;
    a memory associated with the at least one processing unit; and
    a teleportation system storable in memory and executable by the at least one processing unit, the teleportation system comprising:
    a system for creating a persona profile for an avatar in a first virtual world;
    a system for transferring persona profiles to and from a disparate virtual world;
    a system for instantiating an inbound avatar in the first virtual world from the disparate virtual world based on a received persona profile of the inbound avatar, wherein the received persona profile of the inbound avatar remains unchanged from a persona profile of an associated avatar in the disparate virtual world, and for disabling the associated avatar in the disparate virtual world;
    a system for analyzing information in the received persona profile of the inbound avatar and automatically selecting a region in the first virtual world to locate the inbound avatar based on the analyzed information in the received persona profile of the inbound avatar; and
    a checking system for granting or denying the inbound avatar access to the first virtual world.

2. The teleportation system of claim 1, further comprising a system for receiving a request for teleportation.

3. The teleportation system of claim 1, wherein the system for transferring includes loading and unloading persona profiles from a remote shared database.

4. The teleportation system of claim 1, wherein the system for transferring sends and receives persona profiles directly to and from the disparate virtual worlds.

5. The teleportation system of claim 1, further comprising an avatar locating system that selectively locates the inbound avatar in a region of the first virtual world.

6. The teleportation system of claim 1, wherein persona profiles are stored in a data construct common to all participating virtual worlds.

7. The teleportation system of claim 1, wherein persona profiles include rendering information, trait information, and inventory information.

* * * * *